United States Patent
Figgins et al.

(10) Patent No.: US 8,051,633 B2
(45) Date of Patent: Nov. 8, 2011

(54) CUTTERBAR ADJUSTMENT SUPPORT FOR A CROP HARVESTING HEADER

(75) Inventors: Ryan M. Figgins, New Holland, PA (US); Geert P. Mortier, Gent (BE); Jeffrey C. Trowbridge, Stevens, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/947,895

(22) Filed: Nov. 17, 2010

(65) Prior Publication Data

US 2011/0232251 A1 Sep. 29, 2011

Related U.S. Application Data

(63) Continuation-in-part of application No. 12/748,550, filed on Mar. 29, 2010, now Pat. No. 7,930,871, and a continuation-in-part of application No. 12/849,162, filed on Aug. 3, 2010, now Pat. No. 7,950,212.

(51) Int. Cl.
*A01D 43/00* (2006.01)
(52) U.S. Cl. ........................................................ 56/181
(58) Field of Classification Search .................... 56/181, 56/153, 15.8, 10.2 E, 504, 17.2
See application file for complete search history.

(56) References Cited

U.S. PATENT DOCUMENTS

| | | | |
|---|---|---|---|
| 2,490,311 A | 12/1949 | Du Rostu | |
| 3,243,199 A | 3/1966 | Birney et al. | |
| 3,432,158 A | 3/1969 | Goodwin | |
| 3,574,990 A | 4/1971 | Calder | |
| 3,780,508 A | 12/1973 | Tashiro | |
| 3,797,211 A | 3/1974 | Turner | |
| 4,168,075 A | 9/1979 | Matschinsky | |
| 4,177,625 A | 12/1979 | Knight et al. | |
| 4,227,363 A | 10/1980 | Kerber et al. | |
| 4,313,294 A | 2/1982 | Martenas | |
| 4,473,993 A | 10/1984 | Jennings et al. | |
| 4,573,308 A | 3/1986 | Ehrecke et al. | |
| 4,599,852 A * | 7/1986 | Kerber et al. | .............. 56/15.8 |
| 4,635,958 A | 1/1987 | Yonemoto | |
| 4,669,256 A | 6/1987 | Emacora et al. | |
| 4,724,661 A * | 2/1988 | Blakeslee et al. | .............. 56/208 |
| 5,157,905 A * | 10/1992 | Talbot et al. | .............. 56/15.9 |
| 5,186,216 A | 2/1993 | Bollier | |
| 5,378,010 A | 1/1995 | Marino et al. | |

(Continued)

FOREIGN PATENT DOCUMENTS

JP 402117410 A 5/1990

*Primary Examiner* — Arpad Fabian-Kovacs
(74) *Attorney, Agent, or Firm* — Michael G. Harms

(57) ABSTRACT

A system for supporting a cutterbar of a crop harvesting header includes an adjustment assembly including a first arm pivotably secured to the header. The first arm includes a first portion configured to support the cutterbar, and a second portion including a torsion device having a mass of elastic material connected to the adjustment assembly. The second portion is configured to be pivotably rotatable about a first axis by the adjustment assembly to selectably increase or decrease a force appliable to the first portion in order to raise or lower the first portion with respect to the header. The system further includes a connecting lever having one end pivotally connected to an interconnecting member and another end coupled to the second arm, wherein the connecting lever has a pivot portion for rotation about a second axis, the second axis is perpendicular to the first axis.

18 Claims, 15 Drawing Sheets

U.S. PATENT DOCUMENTS

| | | | |
|---|---|---|---|
| 5,464,371 A * | 11/1995 | Honey | 460/20 |
| 5,535,578 A | 7/1996 | Honey | |
| RE35,543 E * | 7/1997 | Patterson | 56/14.4 |
| 5,685,527 A | 11/1997 | Harbali et al. | |
| 5,921,569 A | 7/1999 | Noutomi et al. | |
| 6,269,619 B1 | 8/2001 | Walch et al. | |
| 6,594,983 B1 * | 7/2003 | Krone et al. | 56/341 |
| 6,675,568 B2 * | 1/2004 | Patterson et al. | 56/208 |
| 7,207,164 B2 * | 4/2007 | Bomleny | 56/10.2 E |
| 7,222,475 B2 * | 5/2007 | Bomleny et al. | 56/10.2 E |
| 7,430,846 B2 * | 10/2008 | Bomleny et al. | 56/10.2 E |
| 7,478,521 B2 * | 1/2009 | Coers et al. | 56/208 |
| 7,555,885 B2 | 7/2009 | Funk et al. | |
| 2004/0065069 A1 * | 4/2004 | Dunn et al. | 56/10.4 |
| 2007/0204584 A1 * | 9/2007 | Coers et al. | 56/15.8 |
| 2008/0072560 A1 * | 3/2008 | Talbot | 56/208 |
| 2008/0078155 A1 * | 4/2008 | Coers et al. | 56/15.8 |
| 2009/0084080 A1 * | 4/2009 | Coers et al. | 56/15.8 |
| 2009/0277144 A1 * | 11/2009 | Honas et al. | 56/153 |
| 2010/0043372 A1 * | 2/2010 | Honas et al. | 56/181 |
| 2010/0269472 A1 * | 10/2010 | Coers et al. | 56/15.8 |

\* cited by examiner

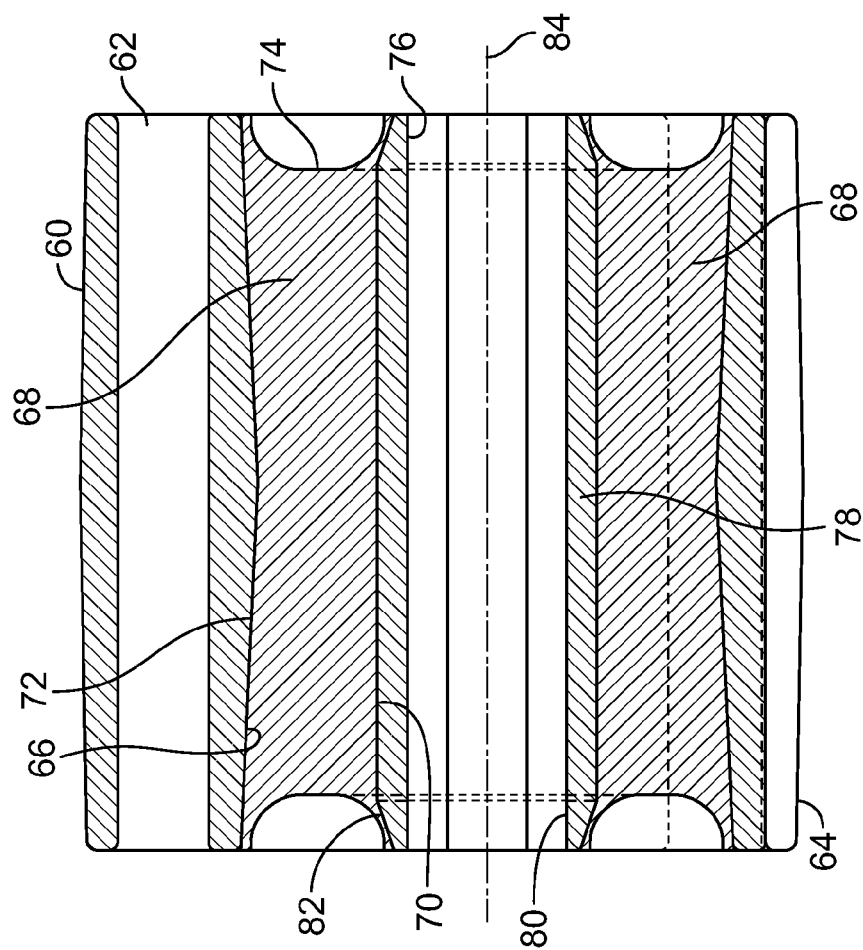
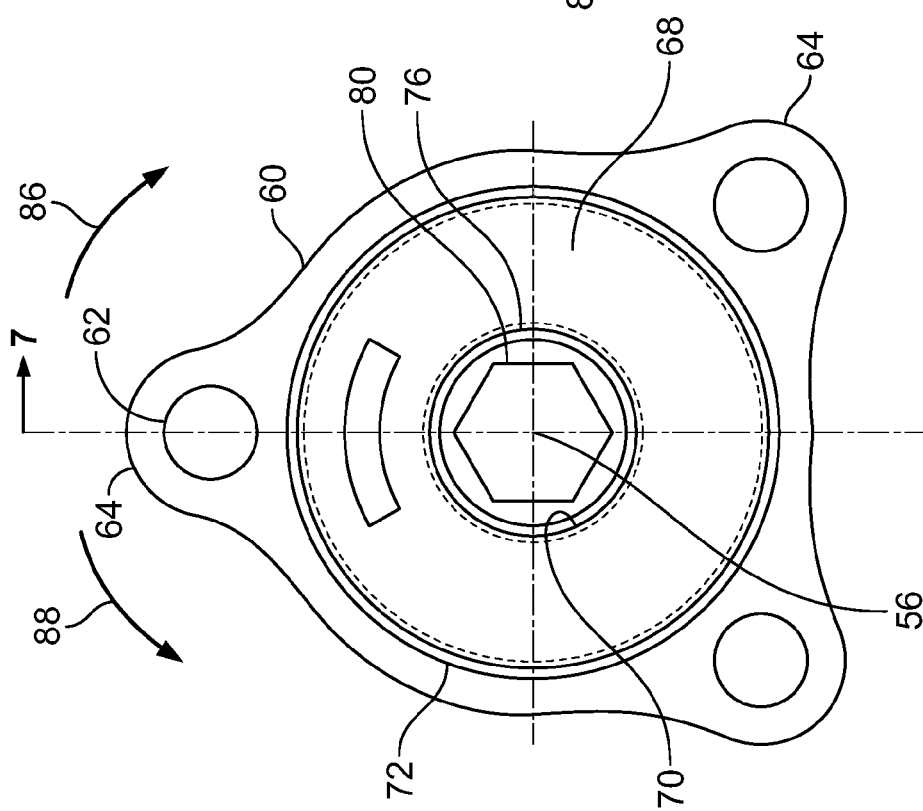
FIG. 7
FIG. 6

CUTTERBAR ADJUSTMENT SUPPORT FOR A CROP HARVESTING HEADER

FIELD OF THE INVENTION

The present invention relates generally to crop harvesting headers for use with crop harvesting devices. It relates more particularly to a system for supporting a cutterbar of a crop harvesting header.

BACKGROUND OF THE INVENTION

The cutting assemblies of the known large headers of plant-cutting machines (e.g., combine, windrower) are typically driven by an oscillating drive, which can include, but is not limited to, an eccentric shaft on a rotating hub, a wobble drive, or a similar well-known commercially-available device. A cutting assembly is typically supported by a flexible cutterbar that spans the width of the opening of the crop harvesting header. The cutterbar is typically supported by arms that extend transverse to the cutterbar. Unfortunately, the weight of cutting assembly is not uniformly distributed across the cutting width of the harvesting header, possibly causing bowing of the cutterbar, and the cutting assembly, resulting in uneven cutting height of the plant, as well as other undesirable results.

What is needed is a system that provides substantially uniform support along the length of the cutting assembly by permitting selective adjustment of the forces the arms provide to the cutterbar.

SUMMARY OF THE INVENTION

The present invention relates to a system for supporting a cutterbar of a crop harvesting header including a plurality of support subassemblies including a first arm pivotably secured to the header. The first arm includes a first portion configured to support the cutterbar, the first arm including a second portion including a torsion device having a mass of elastic material connected to an adjustment assembly. The second portion is configured to be pivotably rotatable about an axis by the adjustment assembly to selectably increase or decrease a force appliable to the first portion in order to raise or lower the first portion with respect to the header. The adjustment assembly is interconnected to the second portion of at least two support subassemblies of the plurality of support subassemblies.

The present invention further relates to a system for supporting a cutterbar of a crop harvesting header including a plurality of support subassemblies including a first arm pivotably secured to the header. The first arm includes a first portion configured to support the cutterbar. The first arm includes a second portion including a torsion device having a mass of elastic material connected to an adjustment assembly. The second portion is configured to be pivotably rotatable about an axis by the adjustment assembly to selectably increase or decrease a force appliable to the first portion in order to raise or lower the first portion with respect to the header. The adjustment assembly is interconnected to the second portion of at least two support subassemblies of the plurality of support subassemblies. The adjustment assembly includes at least one hydraulic ram in fluid communication with a pressurized fluid source, and further includes an adjustment device associated with each support subassembly.

The present invention yet further relates to a kit for supporting a cutterbar of a crop harvesting header, the header including a plurality of support subassemblies comprising a first arm pivotably secured to the header, the first arm including a first portion configured to support the cutterbar, the first arm comprising a second portion including a torsion device having a mass of elastic material, the kit includes at least two adjustment assemblies, each adjustment assembly of the at least two adjustment assemblies is configured for connection to a second portion of a first arm of each support subassembly, each second portion configured to be pivotably rotatable about an axis by the corresponding adjustment assembly to selectably increase or decrease a force appliable to the first portion in order to raise or lower the first portion with respect to the header. The at least two adjustment assemblies are interconnected to the second portion of the at least two support subassemblies of the plurality of support subassemblies.

An advantage of the present invention is the application of a substantially uniform support force for the cutterbar, resulting in improved crop harvesting.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6 is an enlarged end view of a torsion device of the present invention.

FIG. 7 is a cross section taken along line 7-7 from FIG. 6 of the present invention.

Wherever possible, the same reference numbers will be used throughout the drawings to refer to the same or like parts.

DETAILED DESCRIPTION OF THE INVENTION

Figure 1:
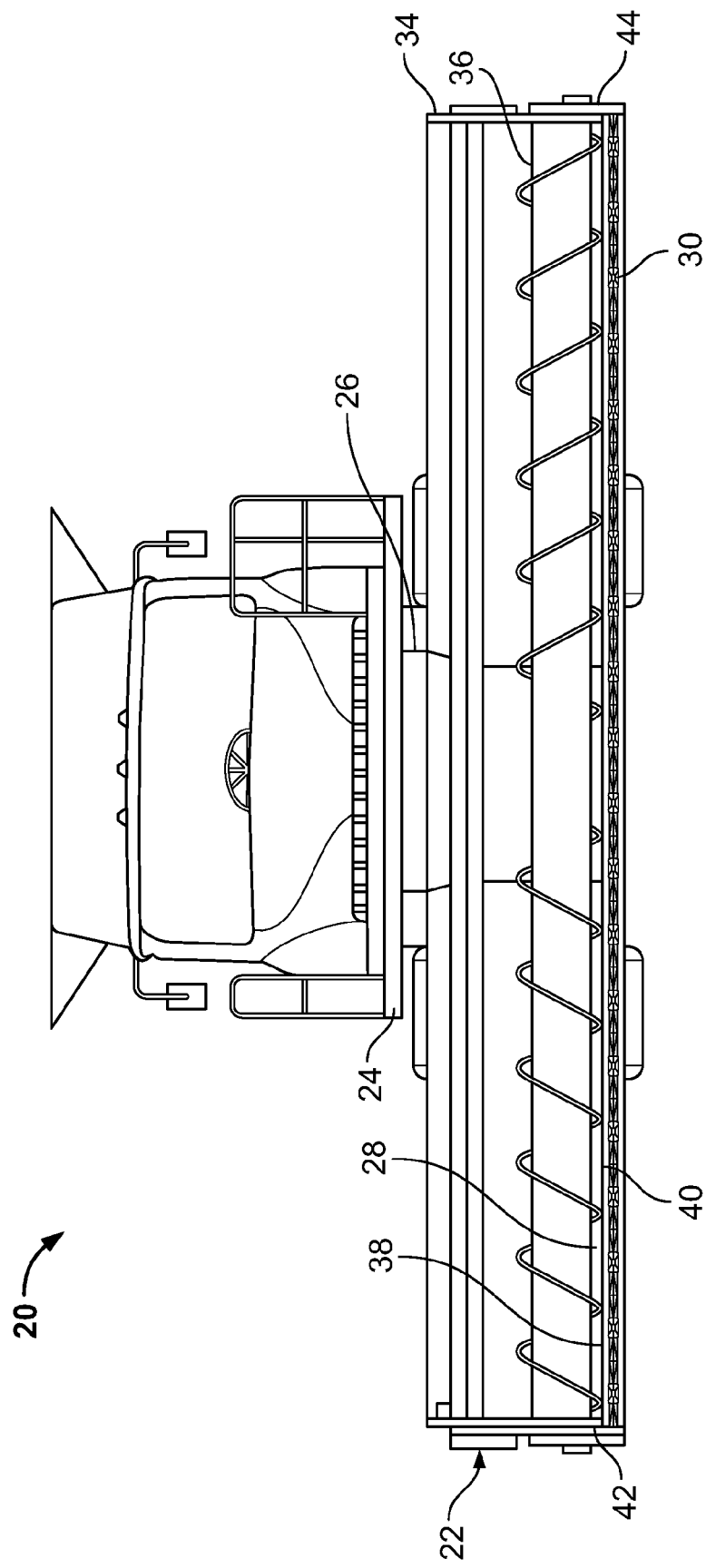
FIG. 1 is a front view of an embodiment of a crop harvesting device and harvesting header of the present invention.

A combine 20, which is a well-known agricultural cutting and harvesting machine, is shown in FIG. 1. Combine 20 includes a header 22, which is configured to cut or sever crops, including (without limitation) small grains (e.g., wheat, soybeans), and to induct the cut or severed crops into a feeder 26. Both functions can be performed as combine 20 moves forward over a crop field.

Figure 2:
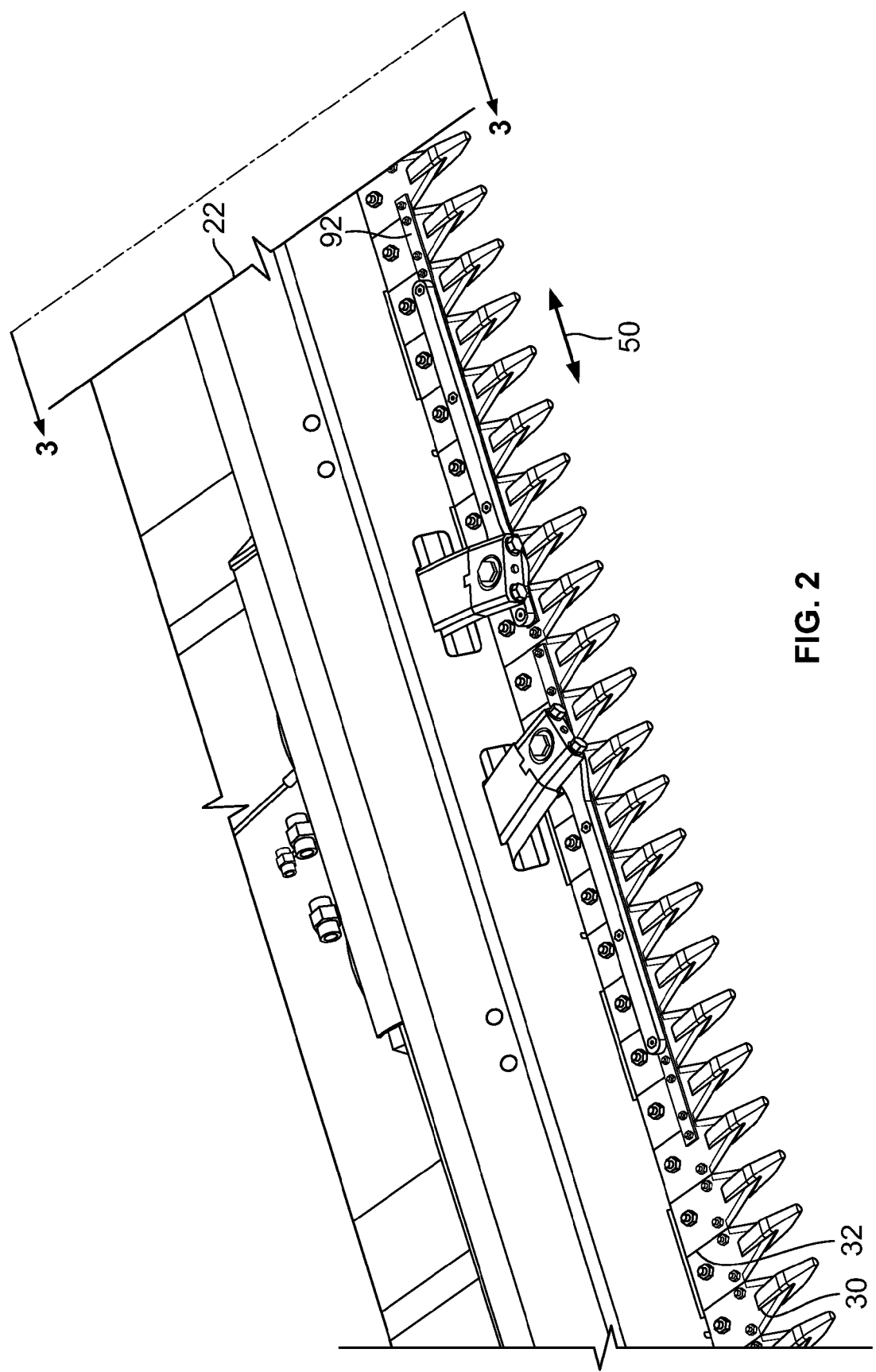
FIG. 2 is a top perspective view of the crop harvesting device of FIG. 1 of the present invention.

Header 22 is attached to a forward end 24 of combine 20 and includes a pan or floor 28 that is supported in desired proximity to the surface of a crop field. Header 22 includes an elongated sidewardly extending sickle 30 along a forward edge portion 32 (see FIG. 2) of floor 28. A cutter or sickle 30 is configured to cut or sever crops, in preparation for induction into a feeder 26. Additionally, header 22 may include an elongate, sidewardly extending reel 34 disposed above sickle 30. Reel 34 is rotatable in a direction suitable for facilitating the induction of cut or severed crops into feeder 26. Header 22 further includes an elongate, rotatable auger 36, which extends in close proximity to a top surface 38 of floor 28 and has helical flights therearound. Auger 36 is configured to cooperate with reel 34 in conveying cut or severed crops to feeder 26, which is configured to convey the cut or severed crops into combine 20 for threshing and cleaning. Alternatively, instead of rotatable auger 36, header 22 may include a draper header or other crop harvesting/gathering header.

Sickle 30 extends along a forward edge 40 of floor 28, and generally is bounded by a first side edge 42 and an opposing second side edge 44, both of floor 28. Sickle 30 is supported by a cutterbar 45 (see FIG. 3) which is likewise supported by a first portion 46 of an elongated member or first arm 48 that will be discussed in further detail below. During operation, sickle 30 reciprocates rapidly to effect a cutting or severing action that cuts or severs plant stems, stalks or other material present between the blades of the sickle. As denoted by arrow 50, the sickle blades can reciprocate sideways.

Figure 3:
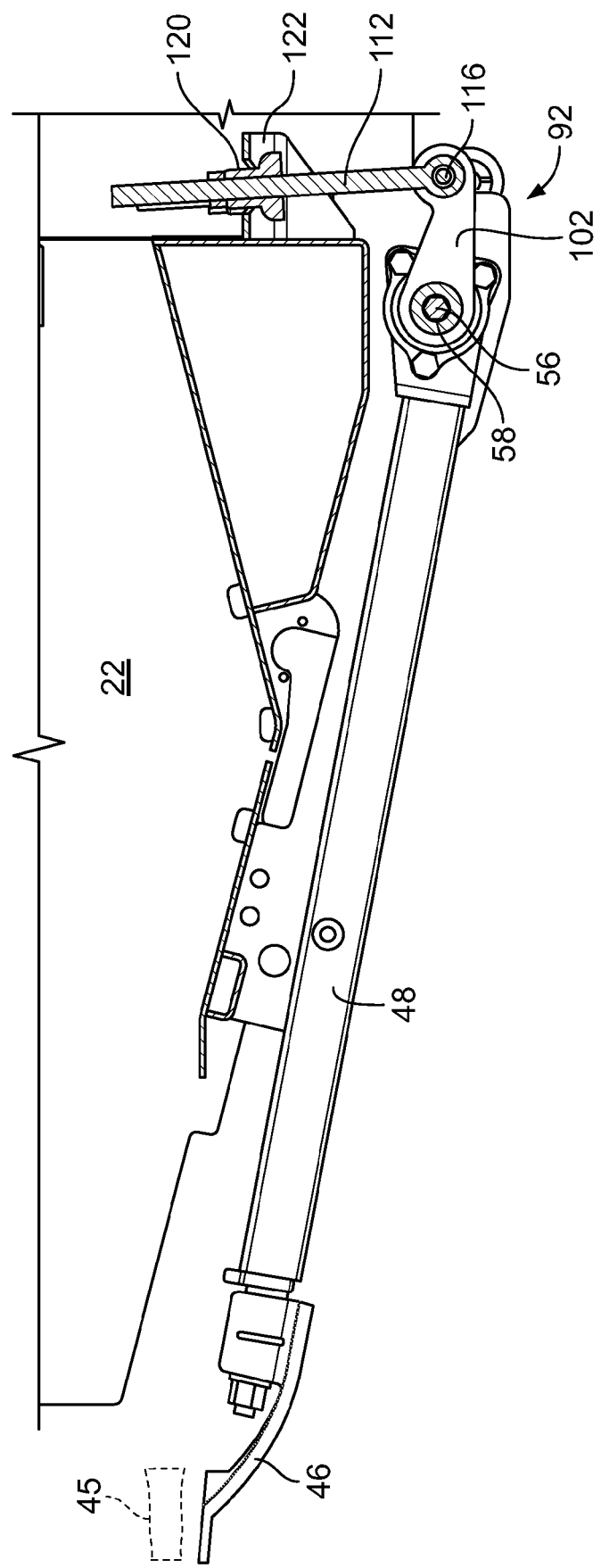
FIG. 3 is a cross section taken along line 3-3 of the present invention.
Figure 4:
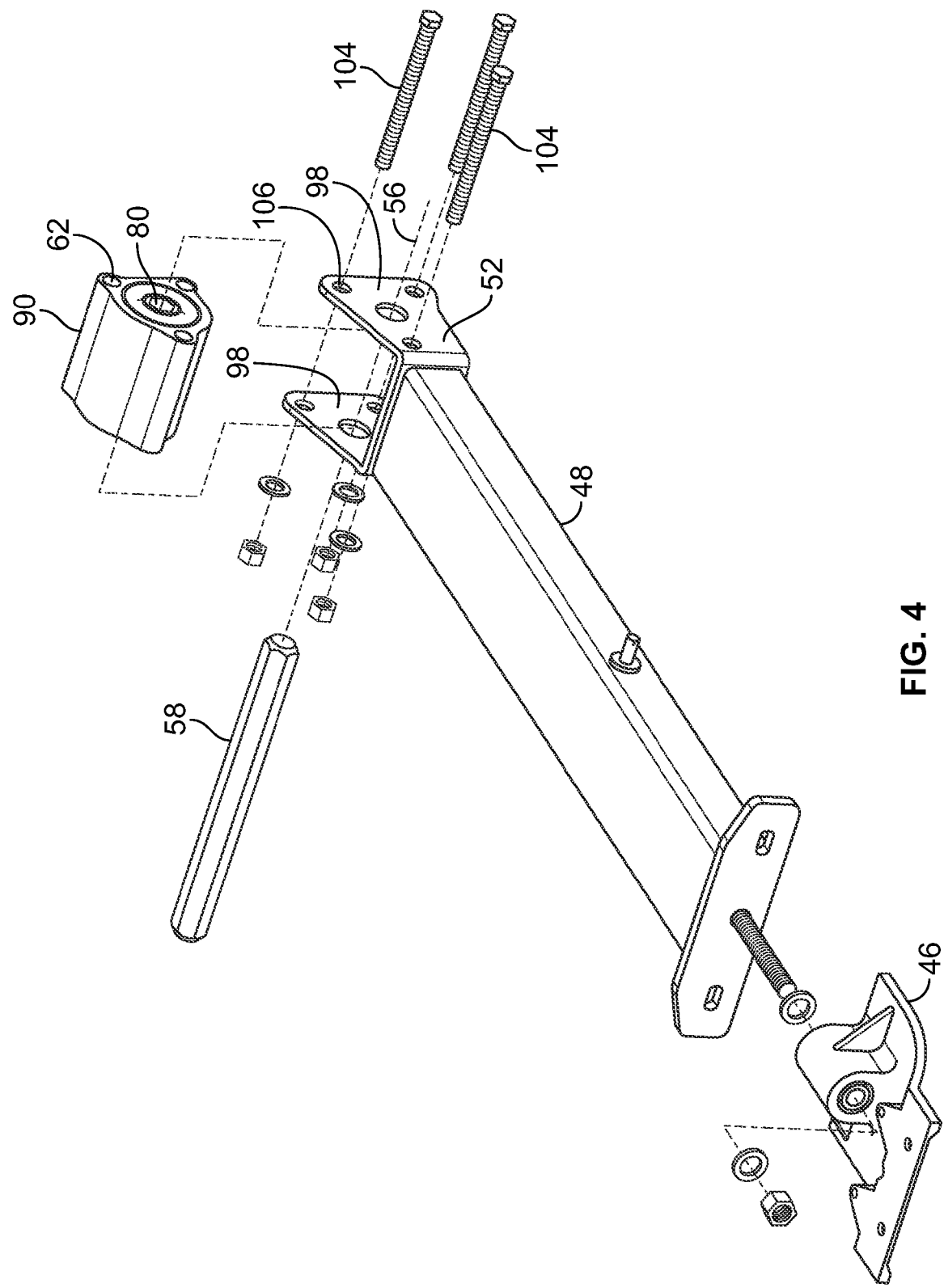
FIG. 4 is an exploded view of a cutterbar support arm of the present invention.
Figure 5:
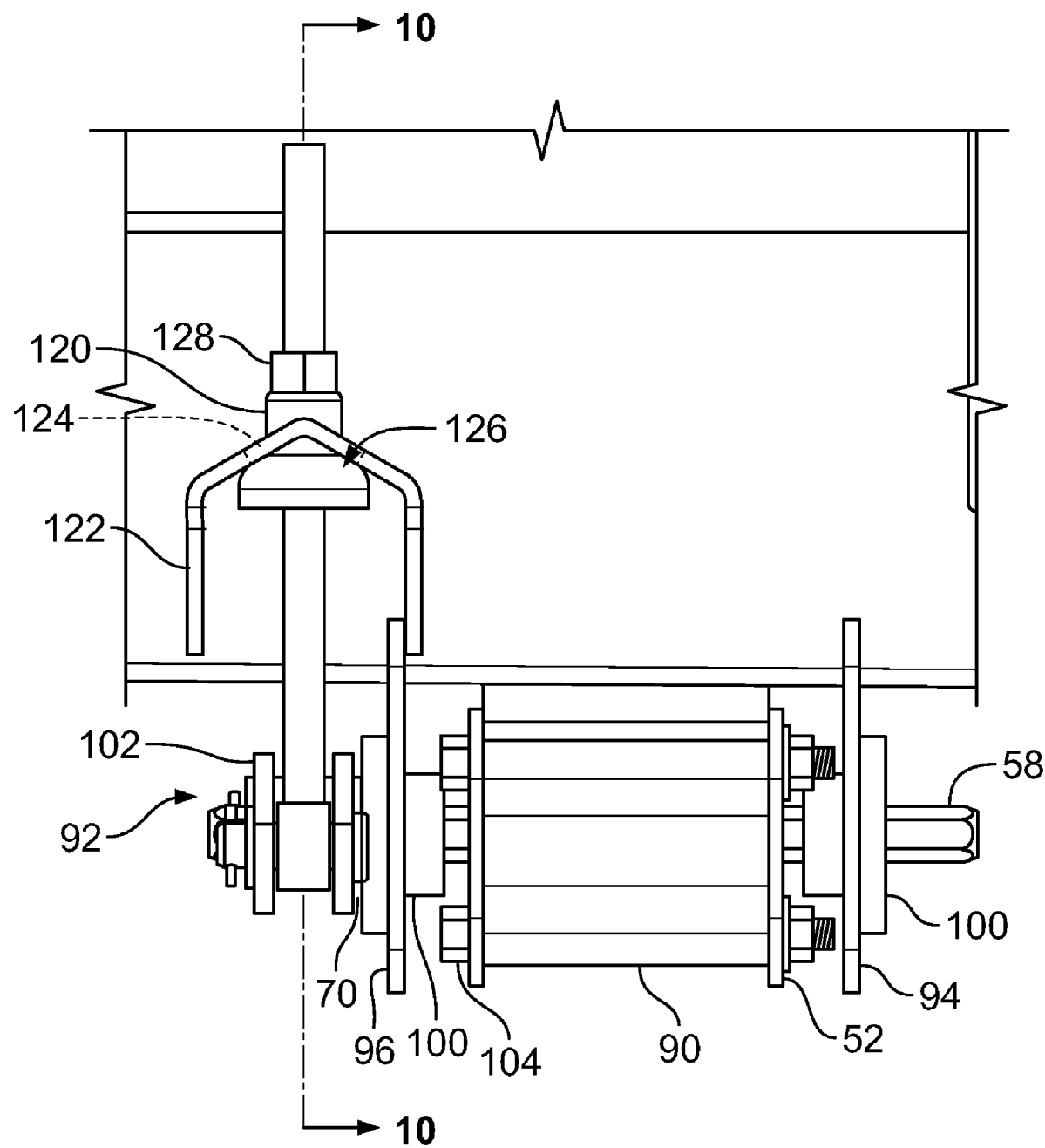
FIG. 5 is a forward-looking end view of an adjustment device of the present invention.

As shown in FIGS. 3-5, a C-bracket or second portion 52 of member or first arm 48 is pivotably secured to header 22 about an axis 56 by a rod 58 having a non-circular periphery, such as a hexagonal periphery. Rod 58 further extends through openings formed in plates 94, 96 that are secured to header 22 and laterally surround second portion 52. In other words, rod 58 extends through each of plates 94, 96, apertures 98 formed in second portion 52 and torsion device 90. That is, fasteners 104 are first inserted through respective aligned openings 106 in second portion 52 and apertures formed in torsion device 90 to secure the torsion device to the second portion (assembling the exploded view of FIG. 4). Once the torsion device 90 is assembled to the second portion 52, aperture 98 of second portion 52 is positioned between and aligned with openings (not shown) formed in plates 94, 96 and their respective bushings 100, rod 58 may then be inserted through plates 94, 96, bushings 100, second portion 52 and torsion device 90 (see FIG. 5). After insertion of rod 58, the outer periphery of rod 58 and an inside surface 80 (see FIG. 4) of torsion device 90 are placed in a non-rotating relationship, i.e., they become mated surfaces. Finally, opening 108 (see FIG. 8) of second arm 102 is aligned and slid over rod 58, with opening 108 and rod 58 defining mating surfaces and fastener 110 installed in rod 58 to secure rod 58 in its installed position. Although second arm 102 forms part of adjustment assembly 92, adjustment assembly 92 will be discussed in further detail below. At this point, in response to first arm 48 being urged into rotational movement about axis 56, by virtue of the mating surfaces between rod 58 and inside surface 80 of torsion device 90 and between opening 108 of second arm 102 and rod 58, rod 58 and second arm 102 would each be urged into rotation about axis 56.

FIGS. 6-7 show a side view and a cross section, respectively, of torsion device 90. Torsion device 90 includes a housing 60 includes a plurality of lobes 64 having corresponding apertures 62 formed in the lobes, permitting the housing to be secured to other structure, such as plate 94, 96 (FIG. 5) by mechanical fasteners 104 extending through the other structure and apertures 62. Housing 60 includes an inside surface 66 that may include a tapered surface, such as shown in FIG. 7. A member 68, which includes an inside surface 70 and an outside surface 72, is composed of a resilient material and is inserted inside of housing 60. In one embodiment, member 68 is composed of a non-metal, such as a rubber material. Inside surface 66 of housing 60 is configured to receive outside surface 72 of member 68 and define a substantially non-rotational contact therebetween. Stated another way, subsequent to insertion of member 68 inside of housing 60, in response to a rotational movement 86 applied in a clockwise direction about axis 56 to housing 60 and an opposed rotational movement 88 applied in a counter clockwise direction about axis 56 to member 68, inside surface 66 and outside surface 72 should not rotatably move with respect to each other. Such non-rotational contact may be established by application of adhesives, interference-fit (due to the periphery of inside surface 66 being larger than the periphery of outside surface 72), mating surface features, such as splines, or the like.

As further shown in FIGS. 6-7, inside surface 70 of member 68 is configured to receive a sleeve 76 having an outside surface 78 and inside surface 80. Housing 60 and sleeve 76 are composed of substantially rigid materials, such as metals. When member 68 and sleeve 76 are assembled together, inside surface 70 of the member and outside surface 78 of the sleeve define a substantially non-rotational contact therebetween, as discussed above. Inside surface 80 of sleeve 76 defines a geometric shape that is configured to receive an object, such as a shaft, in a substantially non-rotational contact. As shown in FIG. 6, inside surface 80 defines a hexagonal profile, although other profiles may be used. In a further embodiment, sleeve 76 may not be used, if inside surface 70 of member 68 defines a hexagonal profile, for example.

As shown in FIG. 7, member 68 includes recessed ends 74. In one embodiment, recessed ends 74 may be created during the normal cooling process of member 68, which may be composed of rubber or another suitable resilient material. That is, member 68 may be heated to a liquid state and then installed while in the liquid state, such as by pouring or injection molding, into housing 60 between inside surface 70 and outside surface 72. During cooling, member 68 bonds to each of inside surface 70 and outside surface 72. In an alternate embodiment, member 68 may be press-fit between inside surface 70 and outside surface 72. In yet another embodiment, member 68 may be secured between inside surface 70 and outside surface 72 by use of an adhesive.

In summary, by virtue of the collective substantially non-rotational contacts established between corresponding surfaces of housing 60, member 68, sleeve 76 and a shaft received by the sleeve, in response to a rotational movement 86 about axis 56 applied by a shaft 58, and a counter rotational movement 88 about axis 56 applied to oppose the rotational movement applied by the shaft, the member is subjected to a torsional force, which is the basis for the equalizing torsional force provided by the support system.

It is to be understood that irrespective the utilization or inclusion of a sleeve as part of the stabilization system of the present invention, resilient member 68 is considered to have been placed in a substantially non-rotational contact with the inside surface of the member with that of the object being inserted inside the sleeve. For example, the sleeve could be associated with either the frame of the header or the frame of the crop harvesting device, depending upon the application and or installation of the stabilization system.

Referring to FIGS. 3, 5, and 8-10, adjustment assembly 92 is now discussed. Adjustment assembly 92 includes second arm 102 having an aperture 114 located distally from opening 108 that is pivotably connected, such as by fastener 118 to a first segment 116 of a first adjustment device 112. In one embodiment, first segment 116 includes an eyelet (see FIG. 3) formed in first adjustment device 112, with the first adjustment device being a threaded rod. First adjustment device 112 is movably connected with a second adjustment device 120. In one embodiment, the second adjustment device is a threaded nut configured to mate with the first adjustment device. After assembly, second adjustment device 120 is placed in abutting contact with the portion of header 22. In one embodiment, the portion of header 22 is a bracket 122, in which the abutting contact occurs between a portion of the exterior surface of second adjustment device 120 and at least a portion of a surface of an aperture 124. In one embodiment, at least a portion of second adjustment device 120 includes a tapered surface 126. In one embodiment, tapered surface 126 is curved. Tapered surface 126 is configured to increase the amount of surface area of the abutting contact between the surface of aperture 124 of bracket 122, thereby reducing the amount of resistance required to move second adjustment device 120 with respect to bracket 122. In a further embodiment, the abutting contact surfaces between tapered surface 126 and aperture 124 define conformal surfaces. That is, the abutting contact surfaces substantially conform with each other to maximize the amount of shared surface area to reduce the amount of resistance between the contact surfaces in response to a given force directed perpendicular to the contact surfaces. To urge rotational movement of second adjustment device 120 with respect to bracket 122, a region 128 is provided to receive a tool, such as a wrench, or in another embodiment, the region defines an opening to receive a lever arm.

By virtue of adjustment assembly 92, such as shown in the FIG. 3, first portion 46 of first arm 48 can be selectively raised or lowered. In other words, in response to a rotational movement in a first rotational direction or a first tendency of second adjustment device 120, second adjustment device 120 is placed in abutting contact with bracket 122 such that the length of first adjustment device 112 between bracket 122 and eyelet 116 is increased, urging second arm 102 to rotate about axis 56. When sufficient rotation of second arm 102 has occurred, and has applied a sufficient torsional force to torsion device 90, first portion 46 of first arm 48 is raised with respect to header 22 subject to the header encountering a stop 132 extending from the first arm. Stop 132 may also be employed to limit the lowest position of first portion 46 with respect to header 22. Conversely, in response to a rotational movement in a second rotational direction or a second tendency of second adjustment device 120, second adjustment device 120 is placed in abutting contact with bracket 122 such that the length of first adjustment device 112 between bracket 122 and eyelet 116 is decreased, urging second arm 102 to rotate about axis 56. When sufficient rotation of second arm 102 has occurred, and has applied a sufficient torsional force to torsion device 90, first portion 46 of first arm 48 is lowered with respect to header 22. Depending upon the application, multiple first arms 48 may be used to provide support for the cutterbar.

It is also to be understood that while adjustment assembly 92 may be used to selectively raise or lower first portion 46 of first arm 48, the same techniques and interaction between components previously discussed may also be used to selectively increase or decrease a force that may be applied to first portion 46 of first arm 48 in order to raise or lower first portion with respect to header 22. That is, for example, stop 132 extending from first arm 46 may be in abutting contact (not shown) with header 22 such that first arm 46 cannot be further lowered with respect to header 22. For purposes of discussion only, and not intending to be limiting, a force of X pounds may be required to raise first portion 46 with respect to header 22. By moving second adjustment device 120 in a first tendency, without raising/lowering first portion 46 with respect to header 22, a force of Y pounds (Y<X) may then be required to raise first portion 46 with respect to header 22. Conversely, by moving second adjustment device 120 in a second tendency, instead of a first tendency, also without raising/lowering first portion 46 with respect to header 22, a force of Z pounds (Z>X) may then be required to raise first portion 46 with respect to header 22. In other words, for purposes of comparison only, X, Y and Z correspond to magnitudes of forces each being applied in the same direction with respect to the header in order to raise or lower the header. In one embodiment, the magnitude of force required to raise or lower the first portion of each first arm would be the same.

Figure 10:
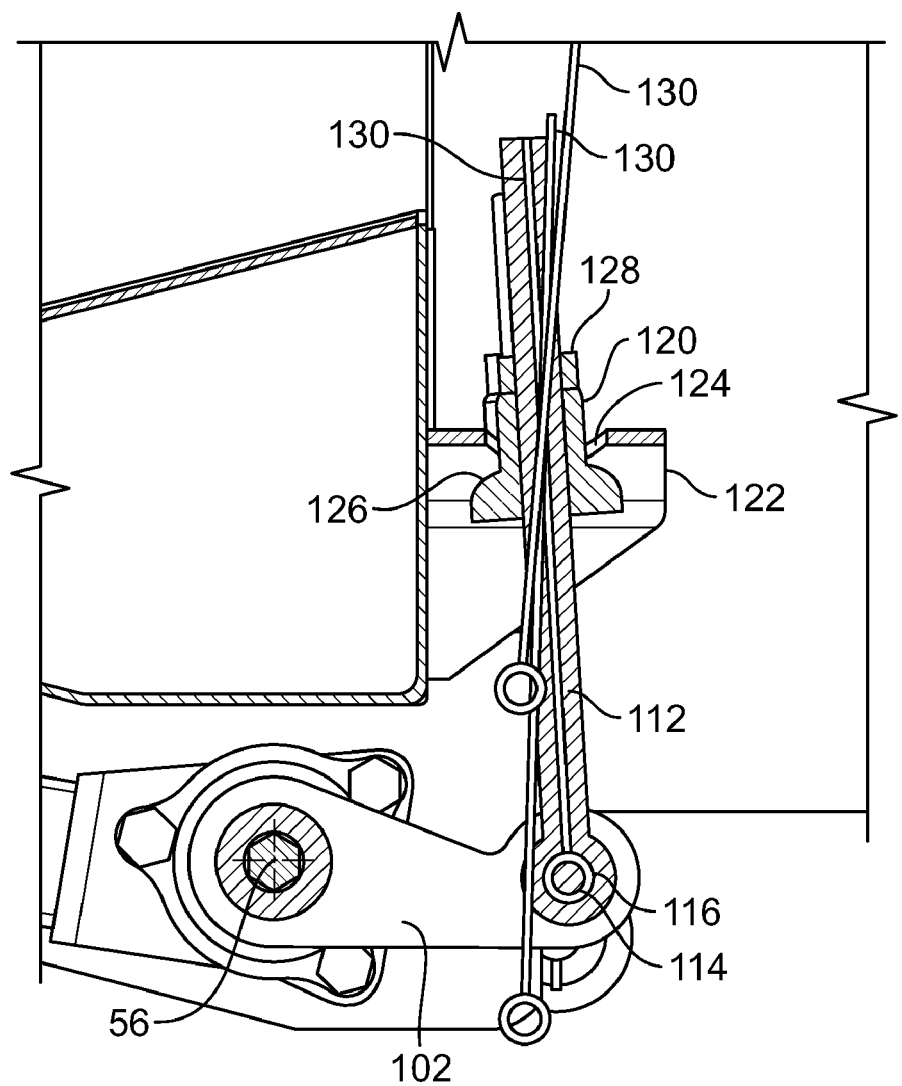
FIG. 10 a cross section taken along line 10-10 of the adjustment device of FIG. 5 of the present invention.

By virtue of the arrangement of adjustment assembly 92, due to first adjustment device 112 being located between second arm 102 and second adjustment device 120, during operation of the adjustment assembly, first segment or eyelet 116 of first adjustment device 112 is configured to follow a predetermined path with respect to axis 56. In the exemplary embodiment as shown in FIG. 10, a predetermined path of first segment or eyelet 116 corresponds to the radius defined by axis 56 and aperture 114 of second arm 102. As a result of this arrangement, over the operating range of adjustment assembly 92, bending forces that could otherwise be applied to first adjustment device and cause damage to the first adjustment device are virtually eliminated. That is, by virtue of the movable abutting contact between tapered surface 126 and the surface of aperture 124 of bracket 122 over the operating range of angular movement of second arm 102 about axis 56, including different positions as shown in respective FIGS. 8 and 9 and as shown in FIG. 10 by a centerline representation 130 of first adjustment device 112, first adjustment device 112 can pivot with virtually no lateral forces associated with the abutting contact.

Figure 11:
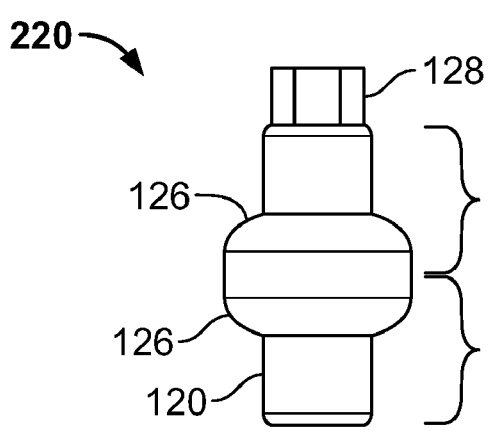
FIGS. 11-12 are embodiments of a second adjustment device of the present invention.
Figure 12:
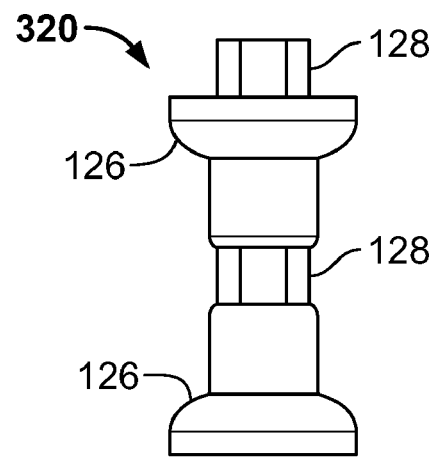

Referring to FIGS. 11 and 12, alternative embodiments of second adjustment device 220, 320 are shown, in which opposed tapered surfaces are combined into a single component. For second adjustment device 220, the larger ends of the tapered surfaces face each other, which would normally require removal of the second adjustment device from the mating first adjustment device if the rotational direction or tendency were to be reverse. For second adjustment device 320, the smaller ends of the tapered surfaces face each other, which should not require removal of the second adjustment device from the mating first adjustment device if the rotational direction or tendency were to be reversed. However, the aperture 124 of bracket 122 would need to be "opened up" to form a slot in order to receive second adjustment bracket 320. Adjustment regions 128 configured to receive tools could be located as shown or in other locations.

Figure 13:
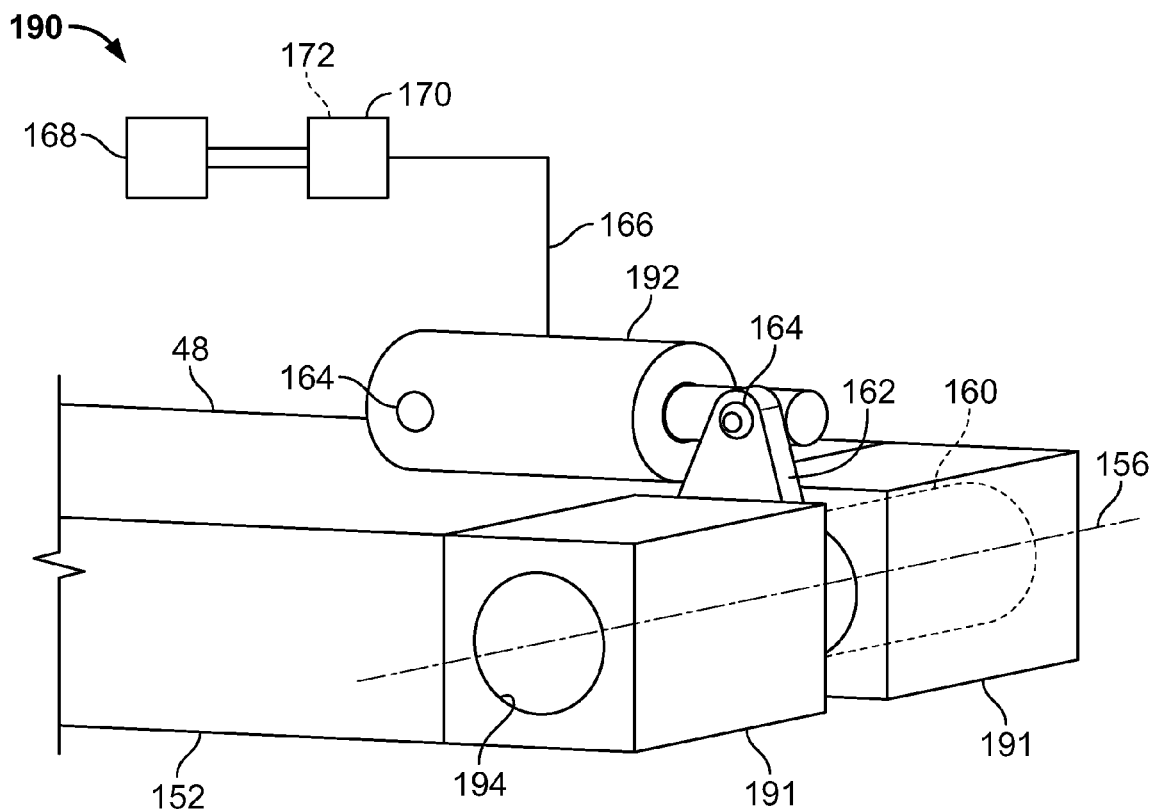
FIGS. 13 and 13A are schematic views of additional embodiments of cutterbar arm support systems of the present invention.
Figure 13A:
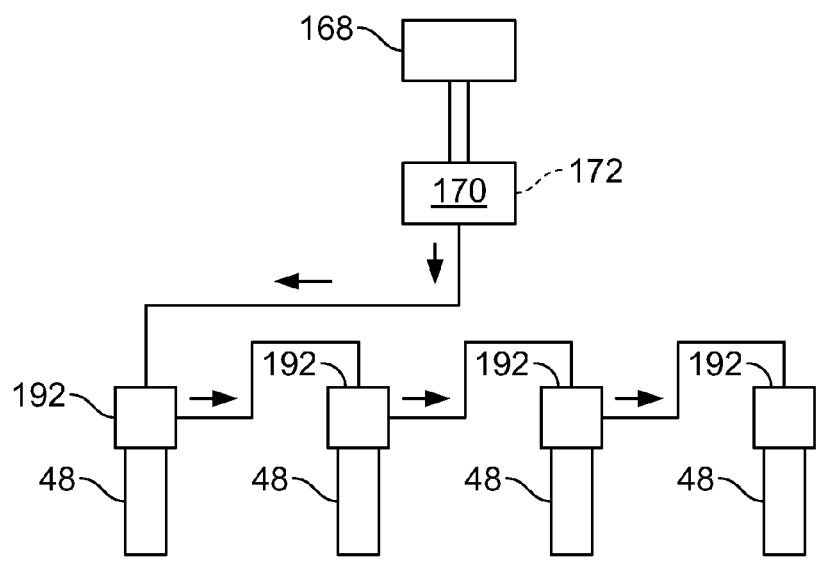

Referring to FIG. 13, an alternate exemplary embodiment of a cutterbar support system is now discussed. The cutterbar support system includes first arm 48 extending to a torsion device 190 associated with and secured to a second portion 152, opposite a first portion (not shown), that is pivotably connected with the header (not shown). An adjustment assembly 192, such as a hydraulic ram or hydraulic cylinder, includes a pivotable connection 164 with the header (not shown) at one end of the adjustment assembly and another pivotable connection 164 at the opposed end of the adjustment assembly with a body 160 that is operably connected to torsion device 190. Torsion device 190 includes a mass of elastic material 191, such as a rubber material. In one embodiment, the elastic material defines a contiguous mass. In another embodiment, the contiguous mass is a block, and in yet another embodiment, the elastic material defines a rectangular block, although other configurations or arrangements may be utilized. Body 160 includes an arm 162 that extends radially outwardly from the body. As further shown in FIG. 13, the elastic material includes a pair of substantially cylindrical openings 194 formed therein that are configured to non-rotatably receive corresponding portions of body 160. That is, the interface between the surface of openings 194 of the elastic material and body 160 does not permit relative rotation therebetween. Although corresponding portions of openings 194 and body 160 are cylindrical, other geometries may also be used. However, due to the elastic nature of elastic material 191, in response to a sufficient force applied by adjustment assembly 192 from a pressurized fluid source 168, the pivotable connection 164 between the adjustment assembly and arm 162 of body 160 results in body 160 rotating about an axis 156. In other words, in response to a sufficient torsional force generated by the product of axial force generated by adjustment assembly 192 and the perpendicular distance of arm 162 from axis 156, body 160 is correspondingly urged into rotational movement about axis 156. Pressurized fluid source 168 is connected to adjustment assembly 192 by fluid line 166, which may be selectably controlled by a control 170. In one embodiment, control 170 may provide an operable connection 172 to selectably control the adjustment assembly with the adjustment assembly being remotely located with respect to the control, such as in a cabin of the combine. FIG. 13A schematically shows an embodiment of a cutterbar support system in which multiple adjustment assemblies 192 are serially connected to each other, although other arrangements may be used.

Figure 8:
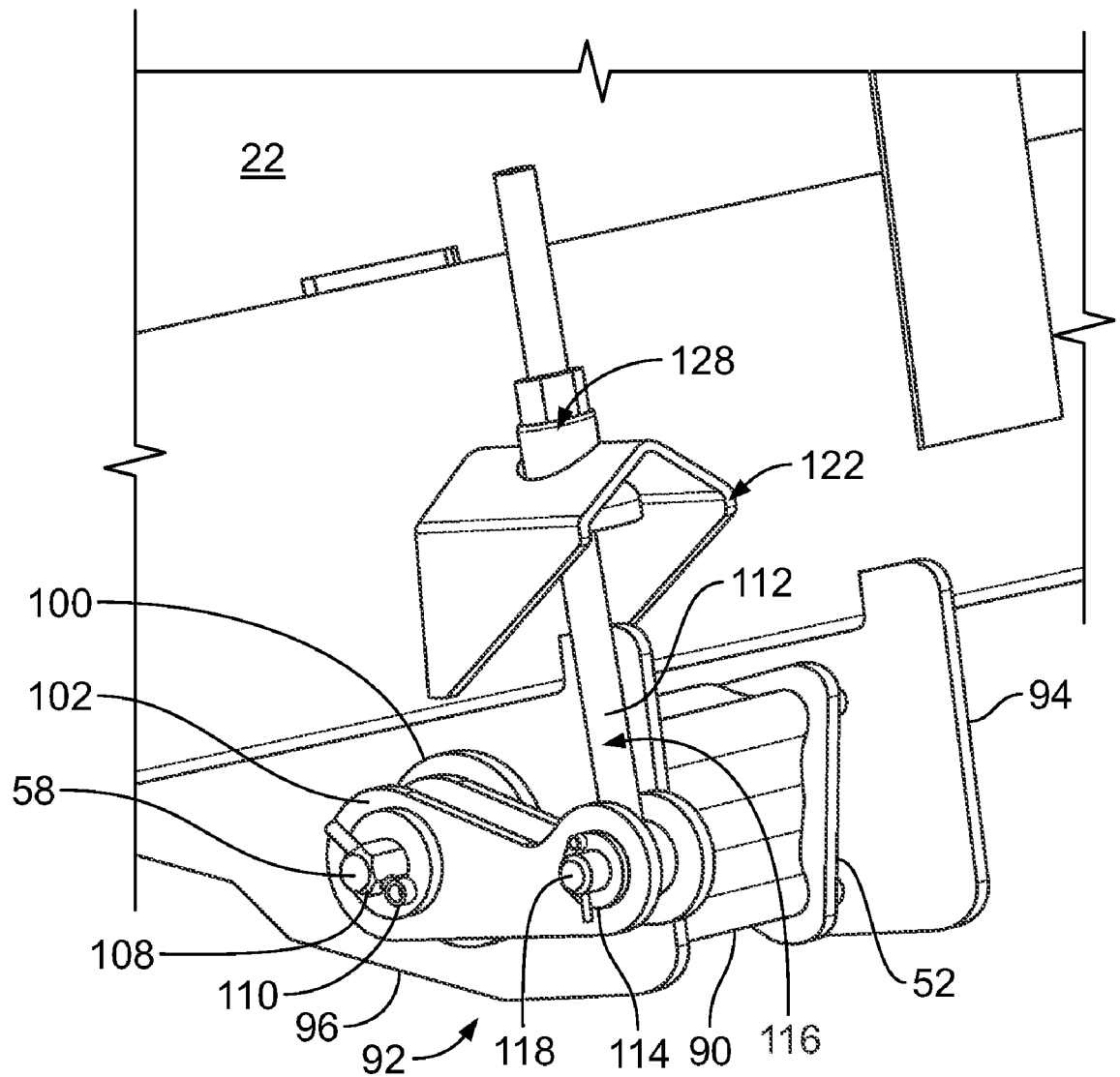
FIGS. 8-9 are enlarged top perspective views of the adjustment device of FIG. 5 shown in different rotational positions of the present invention.
Figure 9:
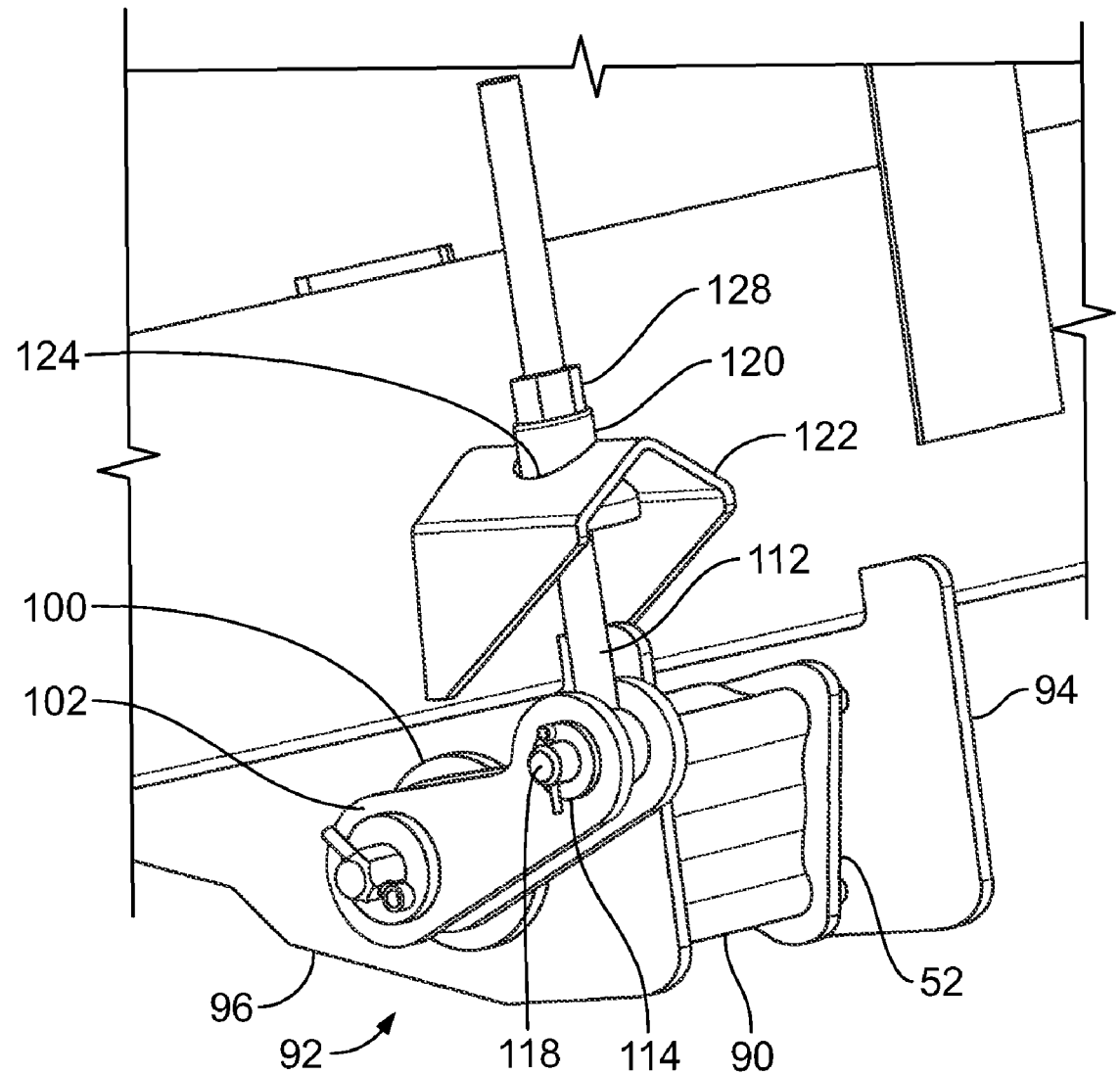
Figure 14:
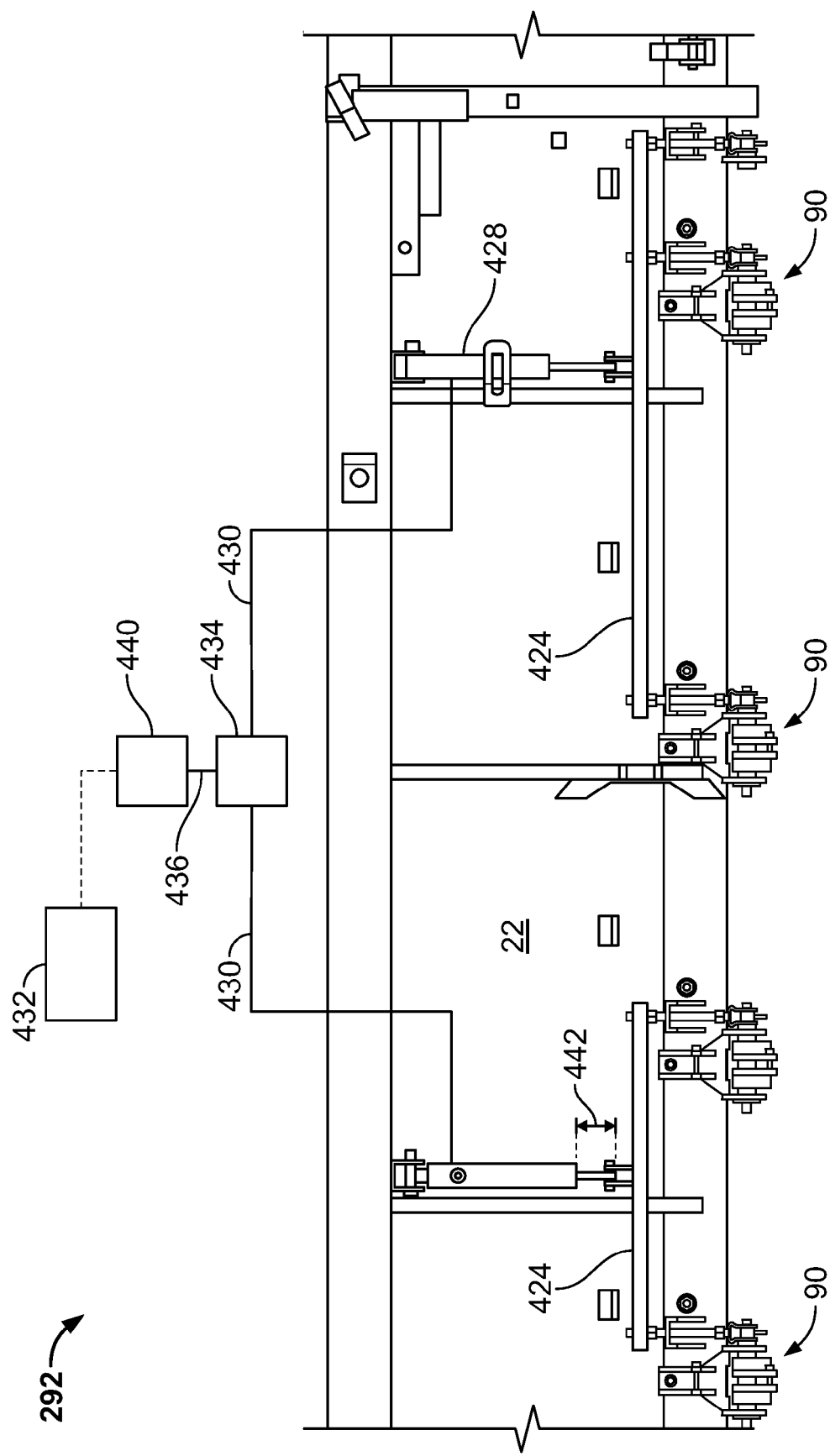
FIG. 14 shows an end view of an alternate embodiment of a cutterbar arm support system in combination with a schematic representation of a pressurized fluid source of the present invention.
Figure 15:
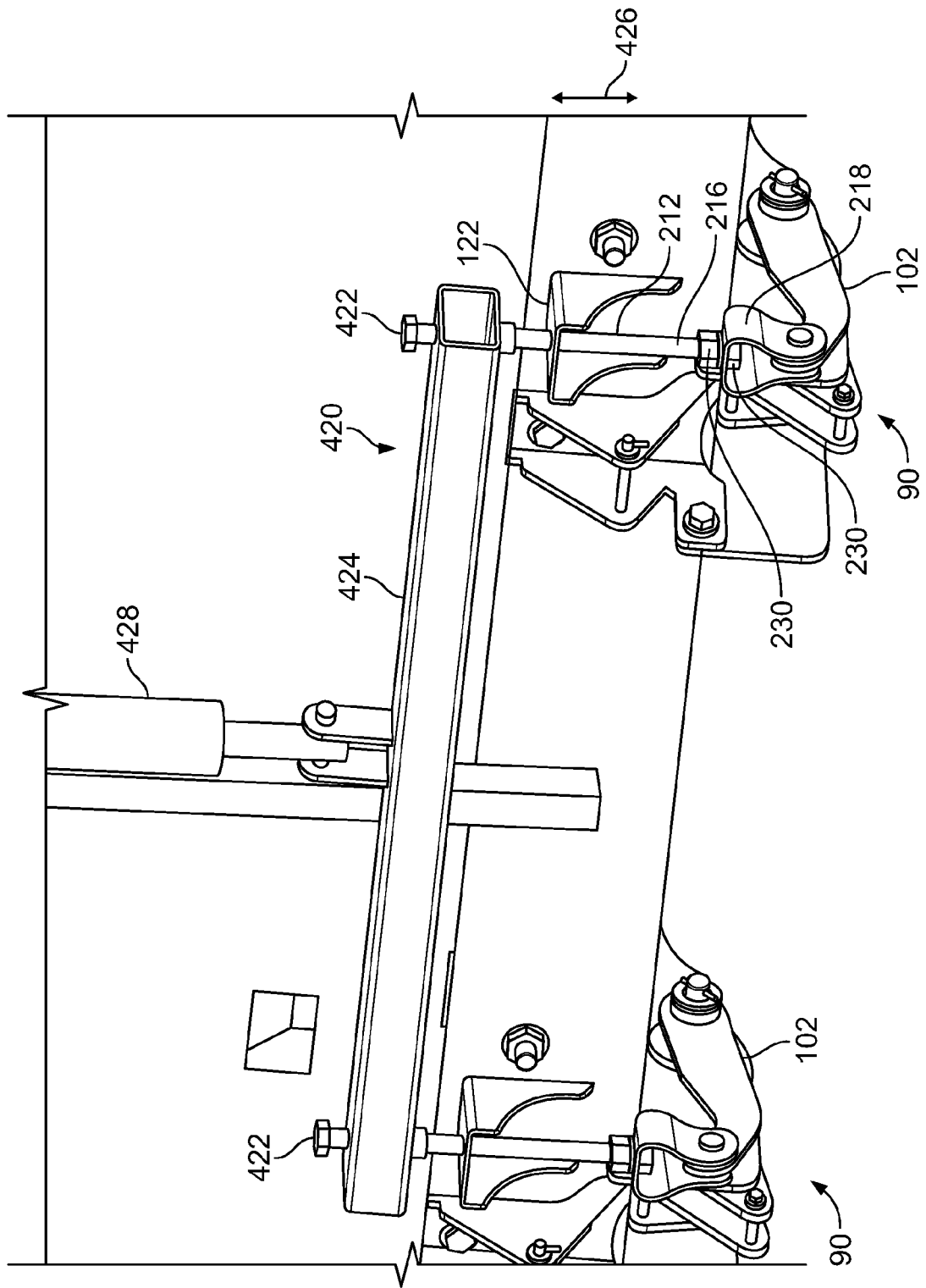
FIG. 15 shows an enlarged, partial perspective end view of FIG. 14 of the present invention.

FIGS. 14-15 show an alternate exemplary embodiment of a cutterbar support system. The cutterbar support system includes an adjustment assembly 292 that is usable with torsion device 90, such as previously discussed and as shown in FIG. 4. The cutterbar support system also utilizes second arm 102 with torsion device 90 as previously discussed and as shown in FIG. 8. A first segment 216 of a first adjustment device 212 is secured to one end of a connecting member 218 and is interposed between one end of second arm 102 and the first segment. A pair of fasteners 230 fixedly secure the end of first adjustment device 212 that is proximate to first segment 216 to connecting member 218. First adjustment device 212 includes a region 422 that is located toward the end opposite first segment 216. Region 422 is configured to receive a tool, such as a hexagonally shaped end for receiving a conventional wrench or other hand tool, for urging first adjustment device 212 into rotational movement with respect to a third adjustment device 420. Third adjustment device 420 includes an interconnecting member 424 that is threadedly engaged with first adjustment device 212. In response to relative rotational movement of first adjustment device 216 with respect to third adjustment device 420, the first adjustment device is urged into axial movement 426, the direction being dependent upon the orientation of the rotational movement. That is, in response to a rotational movement in one direction, the spacing between first segment 216 and interconnecting member 424 is reduced, and urges arm 102 into rotational movement. However in response to a rotational movement in an opposite direction, the spacing between first segment 216 and interconnecting member 424 is increased. An adjustment device 428, such as a hydraulic ram or hydraulic cylinder holds the interconnecting member 424 stationary. The selectable change in spacing permits enhanced independent control of cutterbar support forces appliable to the cutterbar, in order to accommodate weight differences that the cutterbars may be required to support.

As further shown in FIGS. 14-15, an adjustment device 428, such as a hydraulic ram, is secured to the header at one end of the adjustment device, and secured to an interconnecting member 424 at the other end of the adjustment device. A fluid line 436 provides pressurized fluid from a pressurized fluid source 432 through a fluid divider 434 that is connected to each adjustment device 428 via fluid lines 430. In one embodiment, fluid divider 434 evenly divides the fluid flow through fluid lines 430 to the adjustment devices 428. In one embodiment, a controller 440 may be utilized to control pressurized fluid source 432. In another embodiment, the pressurized fluid source does not include an accumulator. In response to an increase in the pressure provided to adjustment device 428, the adjustment device exerts an increased axial force parallel to directional arrows 442, urging the interconnecting members toward torsion devices 90, resulting in an increase in the amount of support provided to the cutterbar. Conversely, in response to a decrease in the pressure provided to adjustment device 428, the adjustment device exerts a decreased axial force parallel to directional arrows 442, urging the interconnecting members away from torsion devices 90, resulting in a reduction in the amount of support provided to the cutterbar.

Once the operator selects the desired settings as permitted by the adjustments to first adjustment devices 212 and adjustment devices 428, the pressurized fluid source is then isolated from the adjustment devices until further adjustment is needed. However, if the pressurized fluid system does not include an accumulator, support provided to the cutterbar will maintain substantially the same, independent of ambient air temperature, and requiring fewer adjustment during operation.

Figure 16:
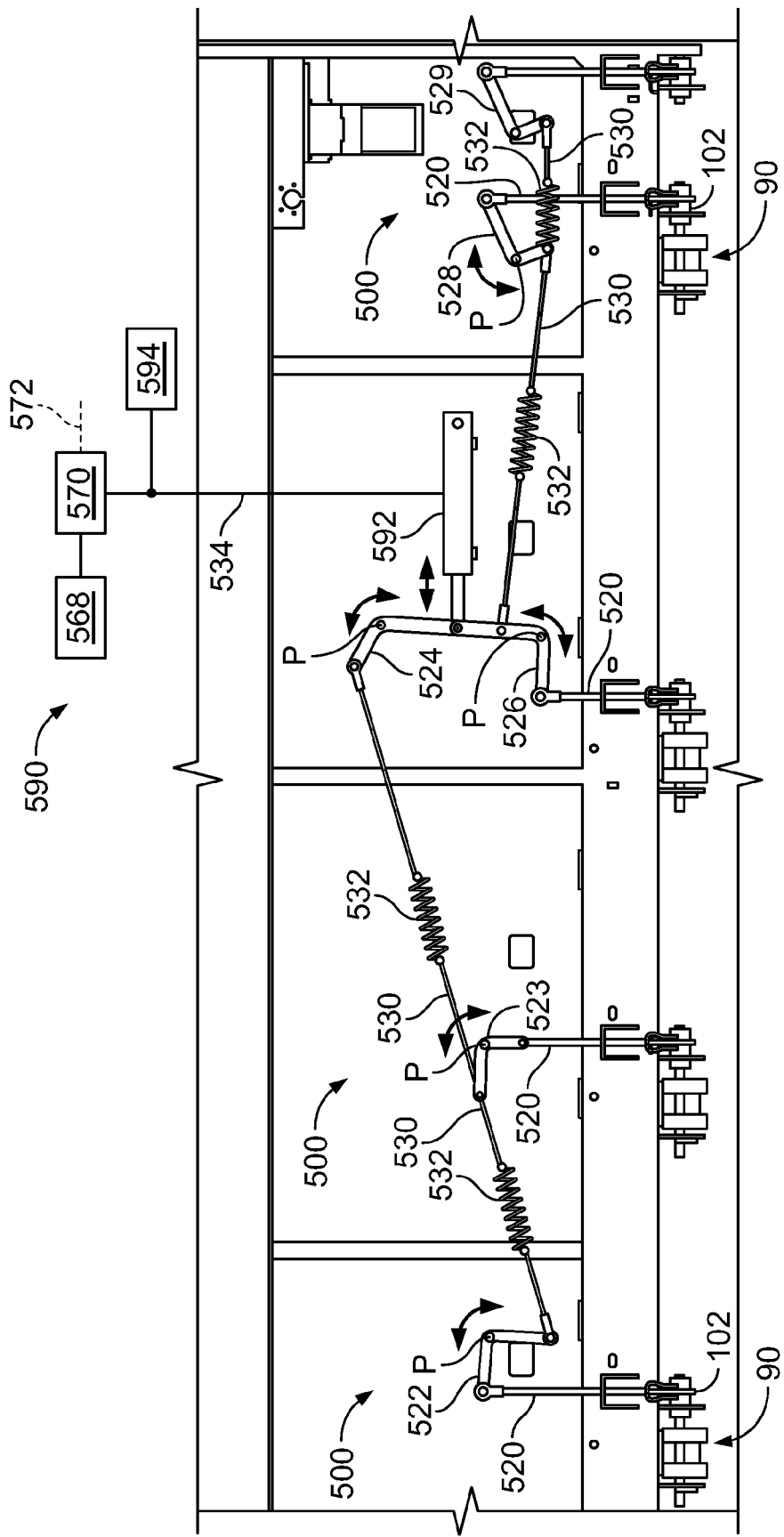
FIG. 16 shows an end view of an alternate embodiment of a cutterbar arm support system in combination with a schematic representation of a pressurized fluid source of the present invention.

FIG. 16 shows an alternate exemplary embodiment of a cutterbar support system. The cutterbar support system includes an adjustment assembly 590 that is usable with torsion device 90, such as previously discussed and as shown in FIG. 4. The cutterbar support system also utilizes second arm 102 with torsion device 90 as previously discussed and as shown in FIG. 8. A linkage 520 is positioned between and pivotably connected to each of second arm 102 and to one end of a lever 522. At the other end of lever 522 is a flexible connection 530, such as a cable or chain which is similarly pivotably connected to one end of another lever 523. Lever 522, as well as each lever shown in the exemplary embodiment of FIG. 16, includes a pivot P that is located between opposed ends of the lever. Positioned between opposed ends of flexible connection 530 is an adjustment device, such as a turnbuckle, that permits selectable adjustment of the length of the flexible connection. Each combination of a linkage, lever, flexible connection and adjustment device associated with a torsion device 90 is referred to as a support subassembly 500. Adjustment assembly 590 includes the support subassemblies 500. As further shown in FIG. 16, a second support subassembly 500 is interconnected with the previously discussed support assembly. That is, lever 523 is interconnected with lever 522 via flexible connection 530, with the end of lever 523 opposite lever 522 defining a pivotable connection with a corresponding linkage 520 that that is similarly associated with an adjacent torsion device 90. The end of lever 523 connected to lever 522 is also connected to a lever 524 by virtue of a corresponding flexible connection 530, which includes a corresponding adjustment device 532. The end of lever 524 opposite flexible connection 530 is pivotably connected to an adjustment device 592, such as a hydraulic cylinder, also referred to as a hydraulic ram.

As further shown in FIG. 16, adjustment device 592 forms two coincident pivotable connections, one connection with lever 524 and a second connection with lever 526. Opposite the pivotable connection with adjustment device 592, lever 526 defines a pivotable connection with a corresponding linkage 520 that is similarly associated with another torsion device 90. Positioned between the pivotable connection with adjustment device 592 and pivot P of lever 526, lever 526 includes an additional pivotable connection with a flexible connection 530, including an adjustment device 532, that extends to yet another lever 528. An end of lever 528 opposite of flexible connection 530 defines a pivotable connection with a corresponding linkage 520 associated with another torsion device 90. As further shown in FIG. 16, the end of lever 528 associated with flexible connection 530 that interconnects with lever 526 is similarly associated with a flexible connection 530 that is interconnected with a lever 529. The end of lever 529 opposite of flexible connection 530 defines a pivotable connection with a corresponding linkage 520 associated with yet another torsion device 90.

Adjustment assembly 590 includes a pressurized fluid source 568 connected to adjustment device 592 by fluid line 534, which may be selectably controlled by a control 570. In one embodiment, control 570 may provide an operable connection 572 to selectably control the adjustment assembly, with the adjustment assembly being remotely located with respect to the control, such as in a cabin of the combine. FIG. 16 schematically shows an embodiment of a cutterbar support system in which multiple adjustment devices 592, 594 (such as one adjustment device for use with each side of the header, with FIG. 16 the linkages associated with adjustment device 594 are not shown), although other arrangements may be used.

Prior to operation, each adjustment device 532 is independently adjusted so that each support subassembly 500 provides sufficient support for its corresponding portion of the cutterbar. Stated another way, each adjustment device is configured to provide independent selective control of a force that is appliable to second arm 102.

In operation, in response to an operator input to control 570 to provide an increased lifting force to the cutterbar, pressurized fluid from fluid source 568 is provided to adjustment device 592, or fluid cylinder or fluid ram. In one embodiment, fluid source 568 is associated with the reel lift fluid circuit, although in other embodiments another fluid circuit may be used. The increase in the magnitude of pressurized fluid in adjustment device 592 urges one end of the fluid cylinder away from the other end of the fluid cylinder, and similarly urges the levers to rotate about their respective pivots P, and similarly urging linkage 520 toward second arm 102 of each torsion device 90, thereby providing the increased lifting force that is supplied to the cutterbar.

Conversely, in response to an operator input to control 570 to provide a decreased lifting force to the cutterbar, pressurized fluid is returned to a fluid source 568 from adjustment device 592, or fluid cylinder. The decrease in the magnitude of pressurized fluid in adjustment device 592 urges one end of the fluid cylinder toward the other end of the fluid cylinder, and similarly urges the levers to rotate about their respective pivots P, and similarly urging linkage 520 away from second arm 102 of each corresponding torsion device 90, thereby providing a decreased lifting force to the cutterbar. In another embodiment, the pressurized fluid source does not include an accumulator.

Once the operator selects the desired settings as permitted by the adjustments to adjustment devices 532 and adjustment devices 592, the pressurized fluid source can then be isolated from the adjustment devices until further adjustment is needed. However, if the pressurized fluid system does not include an accumulator, support provided to the cutterbar will maintain substantially the same, independent of ambient air temperature, and requiring fewer adjustments during operation.

For each support subassembly 500, once individual adjustment of adjustment devices 532 has occurred, subsequent adjustments to each support subassembly 500 should be substantially the same. That is, in response to a movement of adjustment device 592, or the hydraulic cylinder or hydraulic ram, the linkages, levers, and flexible connections are configured to provide substantially the same amounts of changes in support provided to the cutterbar.

Figure 17A:
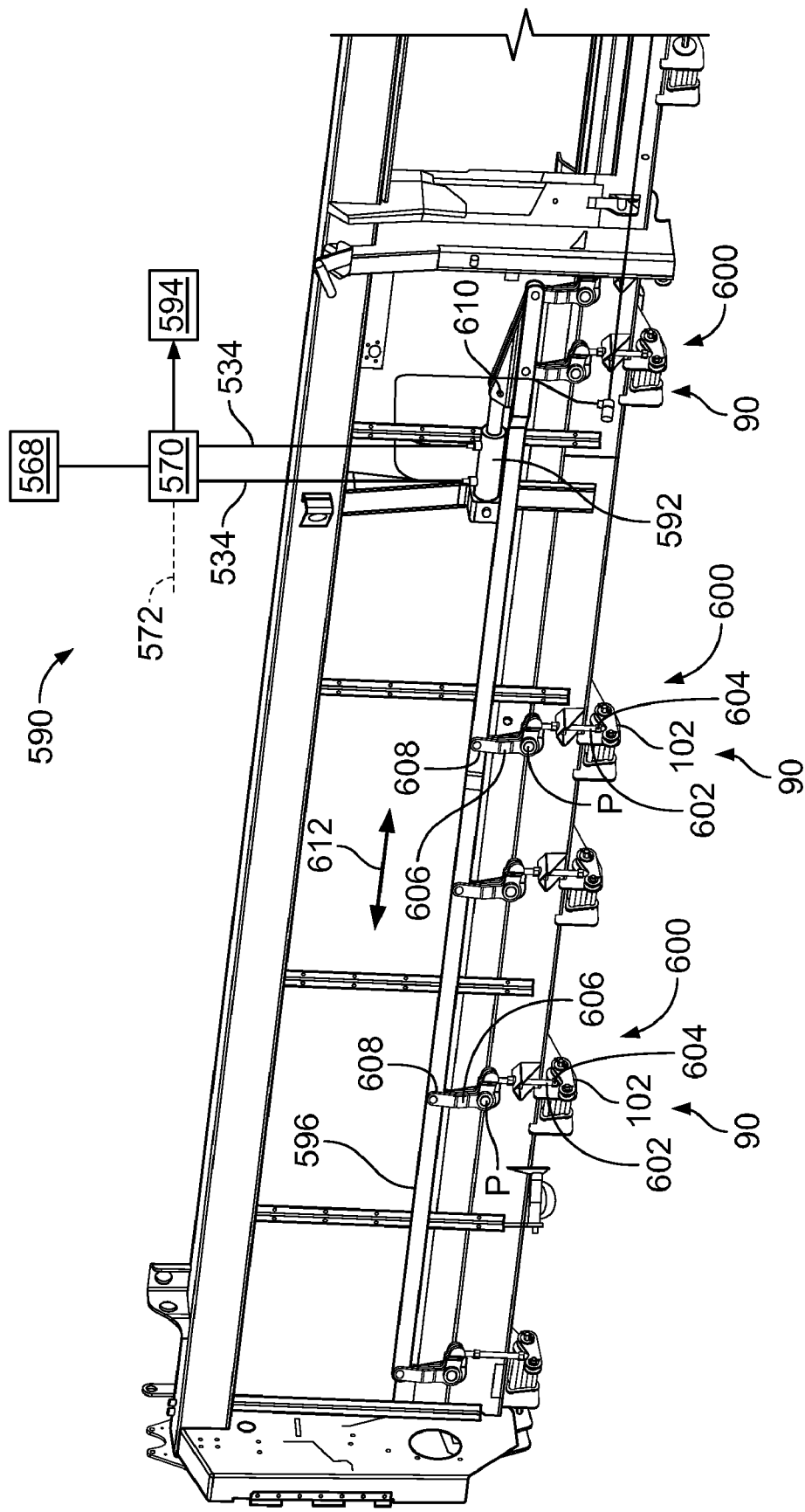
FIGS. 17A and 17B shows respective end views of an alternate embodiment of a cutterbar arm support system in combination with a schematic representation of a pressurized fluid source of the present invention.
Figure 17B:
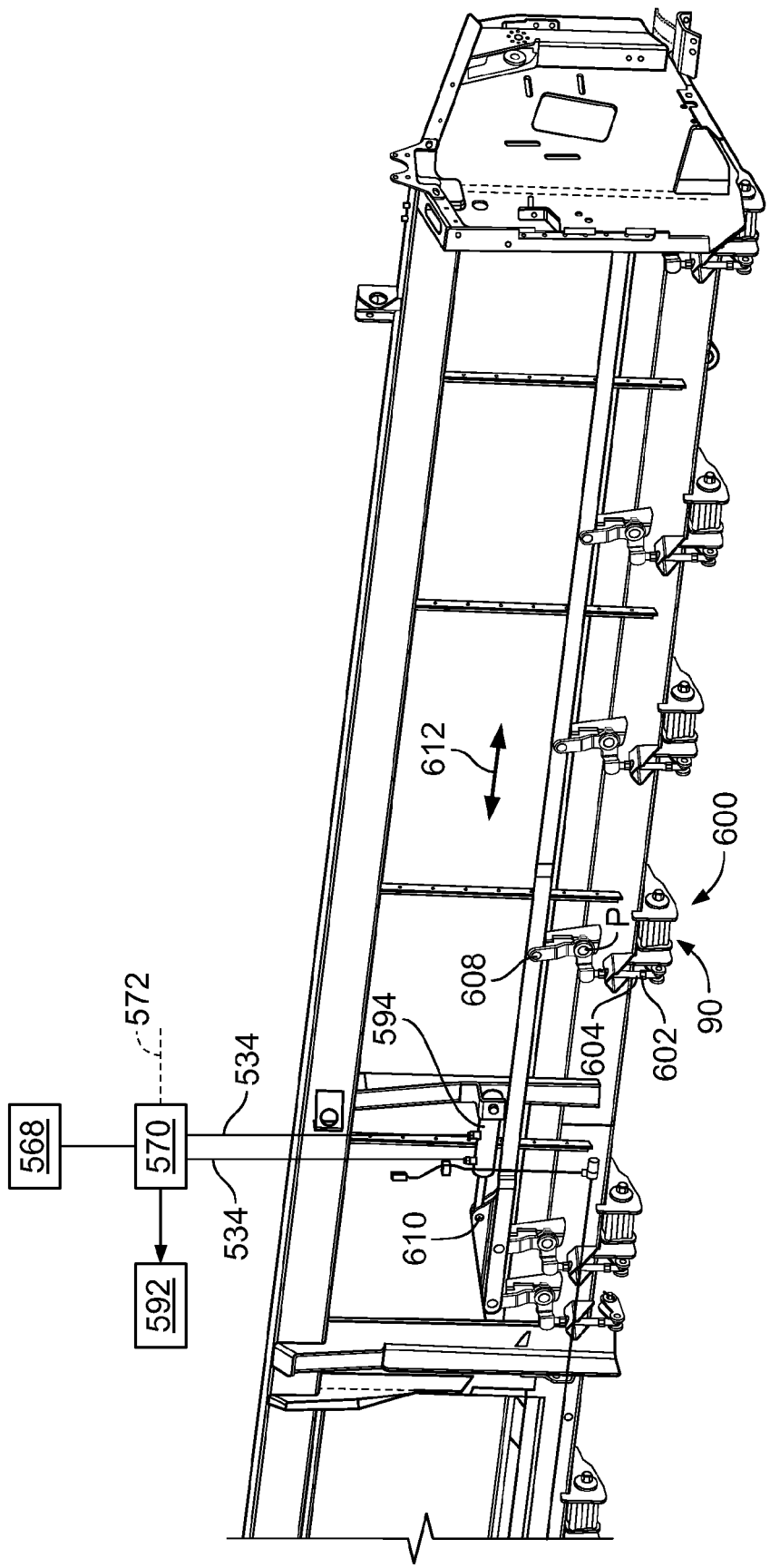

FIGS. 17A and 17B show an alternate exemplary embodiment of a cutterbar support system. The cutterbar support system includes an adjustment assembly 590 that is usable with torsion device 90, such as previously discussed and as shown in FIG. 4. The cutterbar support system also utilizes second arm 102 with torsion device 90 as previously discussed and as shown in FIG. 8. A linkage 602 is positioned between and pivotably connected to each of second arm 102 and to one end of a lever 606. Linkage 602 includes an adjustment device 604, such as a turnbuckle or other device that changes the length of the linkage. At the other end of lever 606 opposite adjustment device 604 is a pivotable connection 608 between lever 606 and an elongated member 596. Lever 606, as well as each lever shown in the exemplary embodiment of FIGS. 17A and 17B, includes a pivot P that is located between opposed ends of the lever. Each combination of a linkage, lever and adjustment device associated with a torsion device 90 is referred to as a support subassembly 600. Adjustment assembly 590 includes the support subassemblies 600. As further shown in FIGS. 17A and 17B, a second support subassembly 600 is interconnected with the previously discussed support assembly by virtue of the pivotable connection 608 with elongated member 596. That is, each of the levers 606 are interconnected with each other via their respective pivotable connection 608 with elongated member 596. There is a pivotable connection 610 between an adjustment device 592 (FIG. 17A; adjustment device 594 for FIG. 17B), such as a hydraulic cylinder, also referred to as a hydraulic ram, and the elongated member 596.

Adjustment assembly 590 includes a pressurized fluid source 568 connected to adjustment device 592, 594 by fluid line 534, which may be selectably controlled by a control 570. In one embodiment, control 570 may provide an operable connection 572 to selectably control the adjustment assembly with the adjustment assembly being remotely located with respect to the control, such as in a cabin of the combine. FIGS. 17A and 17B schematically show an embodiment of a cutterbar support system in which multiple adjustment devices 592, 594 are connected in series (such as one adjustment device for use with each side of the combine header), although other arrangements may be used. In one embodiment, adjustment device 592 operates independently of adjustment device 594.

Prior to operation, each adjustment device 604 is independently adjusted so that each support subassembly 600 provides sufficient support for its corresponding portion of the cutterbar. Stated another way, each adjustment device is configured to provide independent selective control of a force that is appliable to second arm 102.

In operation, in response to an operator input to control 570 to provide an increased lifting force to the cutterbar, pressurized fluid from fluid source 568 is provided to adjustment device 592, 594 or fluid cylinder. The increase in the magnitude of pressurized fluid in adjustment device 592 urges one end of the fluid cylinder away from the other end of the fluid cylinder, and similarly urges the elongated member 596 to move axially in one direction parallel to arrow heads 612, similarly urging levers 606 to rotate about their respective pivots P, and further similarly urging their respective linkage 602 toward second arm 102 of each torsion device 90, thereby providing the increased lifting force applied to the cutterbar.

Conversely, in response to an operator input to control 570 to provide a decreased lifting force to the cutterbar, pressurized fluid is returned to a fluid source 568 from adjustment device 592, 594 or fluid cylinder. The decrease in the magnitude of pressurized fluid in adjustment device 592, 594 urges one end of the fluid cylinder toward the other end of the fluid cylinder, and similarly urges the elongated member 596 to move axially in a direction opposite that previously discussed, similarly urging levers 606 to rotate about their respective pivots P, and further similarly urging their respective linkage 602 away from second arm 102 of each torsion device 90, thereby providing a decreased lifting force that is applied to the cutterbar.

Once the operator selects the desired settings as permitted by the adjustments to adjustment devices 604 and adjustment device 592, 594 the pressurized fluid source can then be isolated from the adjustment devices until further adjustment is needed. However, if the pressurized fluid system does not include an accumulator, support provided to the cutterbar will maintain substantially the same, independent of ambient air temperature, and requiring fewer adjustment during operation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for supporting a cutterbar of a crop harvesting header comprising:
    an adjustment assembly including
    a first arm pivotably secured to the header, the first arm including a first portion configured to support the cutterbar, the first arm comprising a second portion including a torsion device having a mass of elastic material connected to the adjustment assembly, the second portion configured to be pivotably rotatable about a first axis by the adjustment assembly to selectably increase or decrease a force appliable to the first portion in order to raise or lower the first portion with respect to the header;
    the adjustment assembly further includes a second arm coupling the torsion device to a linkable movable in a substantially vertical direction;
    an interconnection member coupled to the header and configured for movement in a horizontal direction;
    a connecting lever having one end pivotally connected to the interconnecting member and another end coupled to the linkage of the adjustment assembly, wherein the connecting lever has a pivot portion for rotation about a second axis, the second axis is perpendicular to the first axis,
    wherein as the interconnecting member is urged in a first horizontal direction, the lever is urged to rotate about the second axis in a first direction, and further the linkage is urged to move toward the second arm thereby rotating the second arm about the first axis in an second direction, wherein the second direction is opposite to the first direction;
    further wherein as the interconnecting member is urged in a second horizontal direction, the lever is urged to rotate about the second axis in a first direction and further the linkage is urged to move away from the second arm thereby rotating the second arm about the first axis in an second direction, wherein the second direction is opposite to the first direction.

2. The system of claim 1, wherein the adjustment assembly includes a hydraulic ram in fluid communication with a pressurized fluid source.

3. The system of claim 2, wherein the pressurized fluid source does not include an accumulator.

4. The system of claim 1, wherein the adjustment assembly includes an adjustment device associated with each support subassembly.

5. The system of claim 4, wherein the adjustment device is a turnbuckle.

6. The system of claim 4, wherein the adjustment assembly includes a lever.

7. The system of claim 6, wherein the adjustment assembly includes an elongated member operably connected to the hydraulic ram and the lever.

8. The system of claim 1, wherein the torsion device is configured to non-rotatably receive the adjustment assembly.

9. The system of claim 1, wherein the torsion device defines a contiguous mass of elastic material.

10. The system of claim 1, wherein the force appliable to the first portion is selectably controllable remotely from the adjustment assembly.

11. The system of claim 2, wherein one or more hydraulic rams of the at least one hydraulic ram operates independently of each other.

12. The system of claim 1, wherein the adjustment assembly is configured to provide independent selective control of a force appliable to each first arm.

13. A system for supporting a cutterbar of a crop harvesting header comprising:
    an adjustment assembly including
    a first arm pivotably secured to the header, the first arm including a first portion configured to support the cutterbar, the first arm comprising a second portion including a torsion device having a mass of elastic material connected to the adjustment assembly, the second portion configured to be pivotably rotatable about a first axis by the adjustment assembly to selectably increase or decrease a force appliable to the first portion in order to raise or lower the first portion with respect to the header; and
    the adjustment assembly further includes a second arm coupling the torsion device to a linkage movable in a substantiall vertical direction;
    an interconnecting member coupled to the header and configured for movement in a horizontal direction;

a connecting lever having one end pivotally connected to the interconnection member and another end coupled to the linkage of the adjustment assembly, wherein the connecting lever has a pivot portion for rotation about a second axis the second axis is perpendicular to the first axis, wherein as the interconnection member is urged in a first horizontal direction the lever is urged to rotate about the second axis in a first direction, and further the linkage is urged to move toward the second arm thereby rotating the second arm about the first axis in an second direction, wherein the second direction is opposite to the first direction;

further wherein as the interconnecting member is urged in a second horizontal direction, the lever is urged to rotate about the second axis in a first direction, and further the linkage is urged to move away from the second arm thereby rotating the second arm about the first axis in an second direction, wherein the second direction is opposite to the first direction, the adjustment assembly further including at least one hydraulic ram in fluid communication with a pressurized fluid source.

14. The system of claim 13, wherein the pressurized fluid source does not include an accumulator.

15. The system of claim 13, wherein one or more hydraulic rams of the at least one hydraulic ram operates independently of each other.

16. The system of claim 13, wherein the adjustment device is a turnbuckle.

17. The system of claim 13, wherein the adjustment assembly includes a lever.

18. The system of claim 17, wherein the adjustment assembly includes an elongated member operably connected to the hydraulic ram and the lever.

\* \* \* \* \*